US009297398B2

(12) United States Patent
Drüke et al.

(10) Patent No.: US 9,297,398 B2
(45) Date of Patent: Mar. 29, 2016

(54) JOINTING HEAD FOR FASTENING ELEMENT, AND A FASTENING METHOD

(75) Inventors: Franz Drüke, Leopoldshöhe (DE); André Hermann Nobbenhuis, Bielefeld (DE); Torsten Draht, Schloβ Holte Stuckenbrock (DE); Carsten Löschner, Bad Lippspringe (DE)

(73) Assignee: BÖLLHOFF VERBINDUNGSTECHNIK GMBH, Bielefeld (DE)

( * ) Notice: Subject to any disclaimer, the term of this patent is extended or adjusted under 35 U.S.C. 154(b) by 0 days.

(21) Appl. No.: 13/981,260

(22) PCT Filed: Jan. 12, 2012

(86) PCT No.: PCT/EP2012/050434
§ 371 (c)(1),
(2), (4) Date: Oct. 4, 2013

(87) PCT Pub. No.: WO2012/100989
PCT Pub. Date: Aug. 2, 2012

(65) Prior Publication Data
US 2014/0020814 A1    Jan. 23, 2014

(30) Foreign Application Priority Data
Jan. 24, 2011   (DE) .......................... 10 2011 009 259

(51) Int. Cl.
*H05B 6/10*   (2006.01)
*F16B 11/00*  (2006.01)
*B23P 19/00*  (2006.01)

(52) U.S. Cl.
CPC .............. *F16B 11/00* (2013.01); *B23P 19/006* (2013.01); *F16B 11/006* (2013.01); *Y10T 156/17* (2015.01)

(58) Field of Classification Search
CPC ......... F16B 11/00; B32B 37/00; B32B 37/12; B29C 65/00
USPC ......... 156/308.2, 64, 272.2, 379.6, 66, 275.7, 156/358, 378; 219/117.1, 633, 634, 99, 98, 219/635
See application file for complete search history.

(56) References Cited

U.S. PATENT DOCUMENTS 4,017,701 A    4/1977  Mittelmann
4,853,075 A    8/1989  Leslie
(Continued)

FOREIGN PATENT DOCUMENTS

CN    1128934    8/1996
CN    2410093    12/2000
(Continued)

OTHER PUBLICATIONS

Written Opinion & International Search Report for PCT/EP2012/050434 dated Jun. 11, 2012, 11 pages.
(Continued)

*Primary Examiner* — Jeff Aftergut
*Assistant Examiner* — Jaeyun Lee
(74) *Attorney, Agent, or Firm* — Reising Ethington P.C.

(57) ABSTRACT

The present invention comprises a jointing head 1, a robot with this jointing head 1, and a fastening method for affixing fastening elements 9 to a component surface B. The jointing head 1 comprises a gripper 30 that removes fastening elements 9 from a removal position E of a cartridge 70 by means of a pivoting movement. In addition, the jointing head 1 comprises a compensation mechanism 40 of the gripper 30 so that, when the fastening element 9 is mounted on a component surface B, the fastening element 9 is optimally arranged adjacent to a hardening source 60 such as a light source.

20 Claims, 10 Drawing Sheets

(56) References Cited

U.S. PATENT DOCUMENTS

Figure 1:
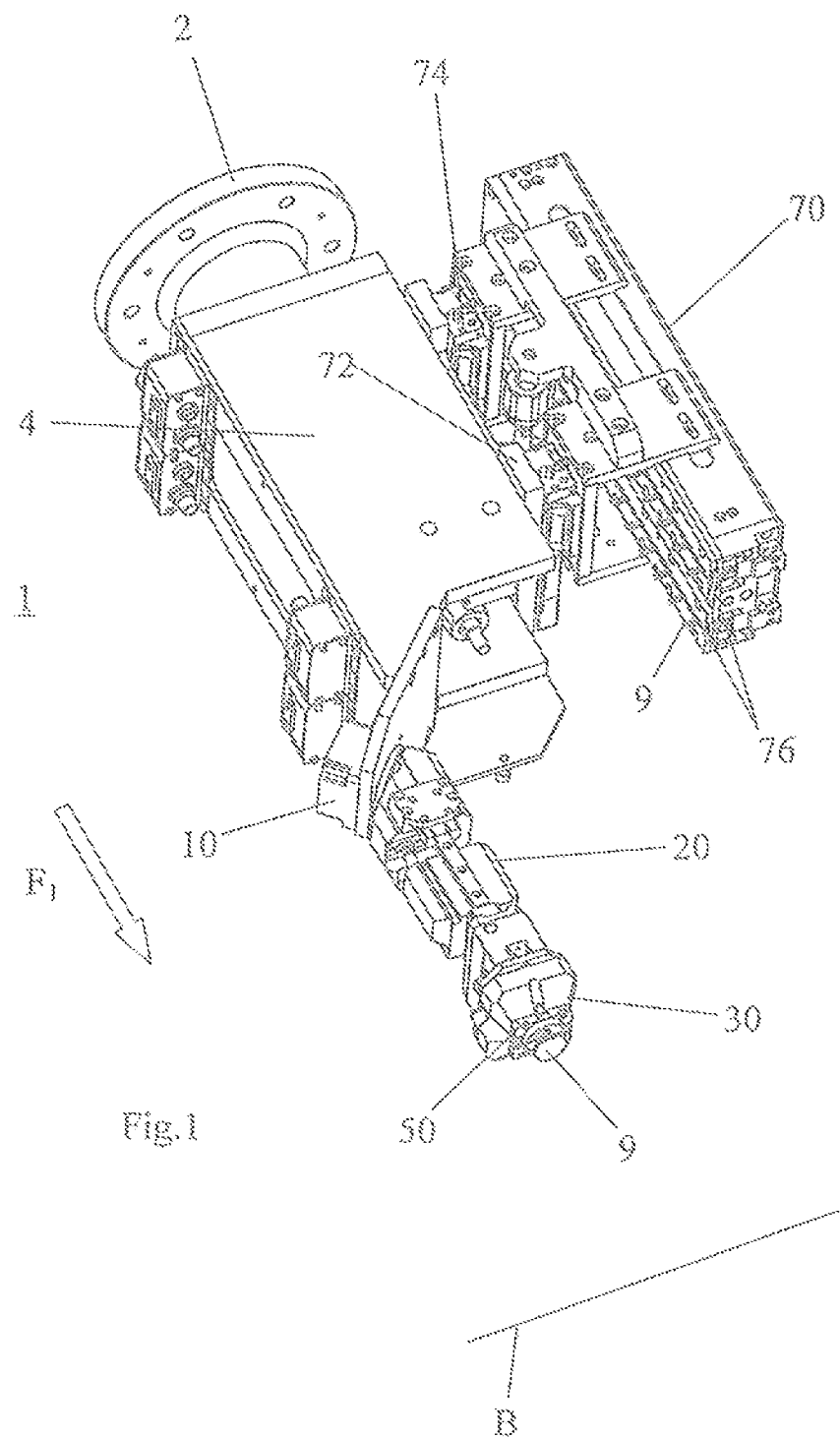

| | | | |
|---|---|---|---|
| 5,657,534 A | 8/1997 | Yi | |
| 5,756,185 A | 5/1998 | Lesser | |
| 6,221,195 B1 | 4/2001 | Lubert et al. | |
| 7,172,676 B2 | 2/2007 | DeMeter | |
| 7,371,303 B2 * | 5/2008 | Schmitt | 156/273.9 |
| 7,597,025 B2 | 10/2009 | Narita et al. | |
| 7,836,788 B2 | 11/2010 | Kamon et al. | |
| 8,344,280 B2 | 1/2013 | Schneider et al. | |
| 8,361,270 B2 | 1/2013 | Schmitt et al. | |
| 2006/0237448 A1 * | 10/2006 | Barber et al. | 219/621 |
| 2007/0051718 A1 | 3/2007 | Schmitt | |
| 2008/0011416 A1 | 1/2008 | DeMeter | |
| 2011/0132520 A1 * | 6/2011 | Druke | 156/64 |

FOREIGN PATENT DOCUMENTS

| | | | |
|---|---|---|---|
| CN | 1688440 | 10/2005 | |
| DE | 2233412 | 1/1974 | |
| DE | 102004012786 A1 | 9/2005 | |
| DE | 102008059242 A1 | 5/2010 | |
| DE | 102009023453 A1 | 12/2010 | |
| DE | 102009057332 A1 * | 6/2011 | B23P 19/006 |
| EP | 2246140 A1 | 11/2010 | |
| EP | 2258508 A1 | 12/2010 | |
| GB | 2178630 | 2/1987 | |
| JP | S4899738 | 12/1973 | |
| JP | H0842528 | 2/1996 | |
| JP | 2001500797 | 1/2001 | |
| JP | 2004148449 | 5/2004 | |
| JP | 2004216535 | 8/2004 | |
| JP | 2006133662 | 5/2006 | |
| JP | 2007529326 | 10/2007 | |
| JP | 2010067579 | 3/2010 | |
| KR | 920007954 B1 | 9/1992 | |
| WO | WO2005095045 A1 | 10/2005 | |
| WO | WO2010057598 A2 | 5/2010 | |

OTHER PUBLICATIONS

English translation of the International Preliminary Report on Patentability for PCT/EP2012/050434 dated Aug. 8, 2013, 9 pages.

CN Office Action for CN Application No. 201280006250.5 dated May 5, 2015 (19 pages).

JP Office Action for JP Application No. 2013-549775 dated Sep. 30, 2014 (4 pages).

KR Office Action for KR Application No. 10-2013-7020576 dated Jun. 25, 2015 (4 pages).

KR Office Action for KR Application No. 10-2013-7020576 dated Dec. 29, 2015 (4 pages).

JP Office Action for JP Application No. 2013-549775 dated Aug. 4, 2015 (9 pages).

* cited by examiner

JOINTING HEAD FOR FASTENING ELEMENT, AND A FASTENING METHOD

1. FIELD OF THE INVENTION

The present invention relates to a jointing head that automatically affixes fastening elements to a component surface by means of a robot or automatic jointing machine. In addition, the present invention relates to a robot connected to this jointing head, as well as a method for affixing the fastening element to a component surface that is realizable with the assistance of this jointing head.

2. BACKGROUND OF THE INVENTION

Within industry, adhesive fastening elements are increasingly being used that hold components and functional parts. Such fastening elements consist for example of a T-shaped structure when looking at the cross-section of these fastening elements. This T-shaped structure comprises a plate-shaped fastening surface to which a bolt-like element with a variable design is fastened. This bolt-like element has for example a thread, a snap connection or any other structures. The plate-like element provides a fastening surface to which adhesive is or has been applied. In order to be held, this fastening surface is then placed on a component surface and is affixed by hardening the adhesive on the fastening surface.

DE 2 233 412 describes a manually actuated affixing device for mounting adhesive elements on component surfaces. The adhesive elements are fastened in a holder with an infrared light source as a heat source arranged behind it for hardening the adhesive on the adhesive element. After the device is arranged at a specific position on the component surface, the holder with the fastening element and the subsequent heat source is moved toward the component surface for mounting where the adhesive of the fastening element is hardened.

Robot-guided fastening devices or jointing heads are for example described in U.S. Pat. No. 4,853,075, EP 2 246 140, DE 10 2004 012 786 and DE 10 2009 057 332. The jointing head in U.S. Pat. No. 4,853,075 grips with its gripper fastening elements which are stored it an element strip. The robot connected to the jointing head and gripper moves to the individual positions on the component surface on which the fastening elements are to be arranged. The robot must be flawlessly controlled and moved to keep from damaging the component surface as well as the fastening element.

In EP 2 246 140, the jointing head attached to a robot is supplied the fastening elements from a reservoir via a supply hose. If different types of fastening elements are to be attached using the same jointing head, different supply hoses are connected to the jointing head. Supplying fastening elements by means of supply hoses impairs on the one hand the interference contour of the robot with the jointing head. In each fastening position to be assumed on the component surface, the supply hose may not be damaged or kinked for example by a vehicle body which would restrict the supply of fastening elements. In addition, to the complex equipment, this affects the controlling and monitoring of the method and lengthens the cycle time for mounting individual fastening elements.

In DE 10 2004 012 786 and DE 10 2009 057 332, the fastening elements are removed from a cartridge before they are mounted on the component surface. To remove a fastening element from the cartridge, the jointing head rotates about a rotary axis perpendicular to the jointing direction of the fastening elements on the component surface. After the fastening element is removed, the listening element is aligned in the jointing direction by the jointing head so that it can be subsequently affixed to the component surface. To mounting the fastening element on the component surface, the jointing head has a linear adjusting device that allows it to extend and shorten in the jointing direction. These different degrees of freedom in the movement of the jointing head require complex controls and process monitoring to affix the fastening elements.

In view of the prior art, it is the objective of the present invention to provide a more simply designed jointing head for affixing a fastening element on component surfaces that is easier to handle in its guided process. In addition, it is the objective of the present invention to supply a corresponding method to affix a fastening element on the component surface.

3. SUMMARY OF THE INVENTION

The above objective is achieved by a jointing head according to independent claim 1, a robot working with this jointing head according to independent claim 13, and a fastening method to affix a fastening element on a component surface according to independent claim 14. Advantageous designs, modifications and developments of the present invention arise from the following description, the accompanying drawings and the dependent claims.

The jointing head according to the invention that is connectable to a robot or an automatic jointing machine so that a fastening element can be automatically mounted and affixed in the jointing direction to a component surface has the following features: a gripper by means of which the fastening element can be removed in a pivoting movement from a removal position into a gripper position, preferably from a cartridge, and can be aligned in a first jointing direction, and a gripper compensation, mechanism by means of which the fastening element can be automatically positioned by a compensation movement of the gripper in a hardening position adjacent to a hardening source for adhesive on the fastening element when mounted on the component surface to thereby ensure a specific supply of energy to the fastening element.

The gripper of the jointing or assembly head according to the invention removes a fastening or fixing element in a pivoting movement from a removal position of a cartridge or supply hose. The pivoting movement of the gripper then aligns the fastening element in the direction of jointing or assembling such that it can be mounted on the component surface by a feed movement of the robot connected to the jointing head. While the fastening element is being aligned relative to the component surface by means of the jointing head, a known robot precisely arranges the position of the fastening element on the component surface. Given this assignment of functions, the jointing head does not execute any linear feed movement in the direction of jointing toward the component surface or away from said component surface. This movement is executed by the known robot. This makes the design of the jointing head simple and less vulnerable. In various embodiments of the present invention, it is preferable to also equip the jointing head with a linear adjusting device in the direction of jointing.

The gripping of the fastening element at the removal position of a cartridge or a supply hose is associated with certain tolerances. Consequently, the fastening element held by the gripper is not optimally aligned with the hardening source. Such a hardening source is for example a light source or heat source, by means of which a light-sensitive or heat-sensitive adhesive can be hardened. When the jointing head is placed on the component surface by the movement of the robot, the compensation mechanism guarantees that the fastening element is arranged as desired adjacent to the hardening source by means of a corresponding relative movement of the gripper toward the hardening source. This arrangement ensures that that needed amount of energy, such as light or heat, can be supplied in a reproducible manner to the fastening element on the component surface to harden the adhesive. Since the compensation mechanism is activated in combination with the mounting movement of the robot, no additional mounting movement is required in the jointing direction by the jointing head on the component surface.

In order to consistently absorb the force exerted on the robot in the direction of jointing when mounting the fastening element on the component surface, the gripper can preferably be swung on a pivot axis at an angle of 45° relative to the jointing direction of the jointing head. This design supports the transmission of force within the jointing head for mounting the fastening element on the component surface and simultaneously guarantees optimum removal of a fastening element from the removal position. Given this arrangement of the pivot axis, the gripper swings along the lateral surface of a cone such that the jointing direction is aligned parallel to the surface line. The aforementioned pivot axis or rotary axis runs parallel to the contour line of the cone. The gripper can assume any desired position on the lateral surface of the cone in order to joint in this direction. The cone preferably has a taper angle of 90° that is enclosed by two opposing lateral surfaces. In this context, taper angles ranging from 60° to 120° are also preferred to reach efficiently different assembling positions.

According to another preferred embodiment of the present invention, the gripper of the jointing head comprises a radially peripheral collar that projects in the jointing direction and encloses the hardening source so that hardening radiation from the hardening source can be bundled toward the fastening element. It is also preferable for the gripper with the collar to have a stop against which the fastening element can rest during the compensation movement of the gripper so that the fastening element is arranged at a specific distance from the hardening source.

The gripper of the jointing head according to the invention is preferably composed of at least two movable gripper jaws. In a closed state, these gripper jaws form a radially peripheral collar that projects in the jointing direction. The hardening source such as a light or heat source is arranged in the radial interior of the collar. The peripheral collar prevents the heat or light radiation from the hardening source from radiating radially outward relative to the direction of jointing. Instead, the radially peripheral collar reflects the radiation from the hardening source at a specific angle in relation to the direction of jointing and hence toward die component surface. This concentration of hardening radiation at the position at which the fastening element is to be affixed accelerates the hardening of the adhesive of the fastening element in comparison to using a hardening source without a peripheral collar. The stop on the peripheral collar ensures that the fastening element is always positioned at the same distance from the hardening source. To this end, the fastening element extends into the jointing head opposite the jointing direction until it lies on the collar stop when the robot mounts the fastening element on the component surface. The tolerances are compensated by this entry movement of the fastening element into the jointing head opposite the jointing direction when gripping the fastening element at the removal position. In addition, the collar is designed to project sufficiently in the jointing direction for a plate of a reversed T-shape fastening element to be almost completely enclosed thereby. When the fastening element is mounted on the component surface, the plate of the fastening element only extends slightly beyond the collar so that the collar does not collide with the component surface. With this arrangement, the hardening radiation such as light or heat is concentrated on the fastening element and is reflected back to it to shorten the hardening time of the adhesive.

It is also preferable for each gripper jaw to have one hardening source. Each gripper jaw is therefore equipped with a radiant heater or light source such as an LED intended for the adhesive which can be operated individually or in combination with each other. Since the hardening source develops heat while it is operating, it can be cooled with a heat sink. For this purpose, each gripper jaw has a sufficiently large surface designed as a cooling surface.

Air is preferably blown onto this cooling surface to dissipate heat. The same is also achieved by the circulating ambient air at each gripper jaw and hardening source. Another preferred alternative is to integrate a liquid cooling system in the gripper jaws through which cooling liquid flows. The cooling liquid thereby dissipates excess heat from the hardening source.

It is also preferable to equip the jointing head with a damping unit which is connected to the gripper. This damping unit dampens mechanical overloading at the jointing head arising from an incorrect feed movement of the jointing head in the jointing direction toward the component surface. According to another preferred embodiment, this damping unit comprises a passive or active linear adjustment of the gripper so that the gripper can be moved passively or actively parallel to the direction of jointing.

According to another preferred embodiment of the present invention, the jointing head has a cartridge with at least one and preferably two storage rails in which fastening elements can be movably accommodated. This cartridge can move parallel and at a right angle to the jointing direction so that a removal position for fastening elements in each storage rail can be reached with the gripper.

Furthermore, the present invention comprises a robot connected to the above-described jointing head.

The present invention also discloses a method for fastening or affixing the fastening element to a component surface. This fastening method according to the invention comprises the following steps: pivoting a gripper of a jointing head to a deposit position for the fastening element adjacent to a cartridge for fastening elements, moving the cartridge parallel and/or perpendicular to its longitudinal axis, and gripping or removing the fastening element at a removal position of the cartridge by the gripper into a gripper position, pivoting the gripper so that the fastening element is aligned in the jointing direction, mounting the fastening element on the component surface, and automatically compensating the difference between the gripper position and a hardening position of the fastening element, so that the fastening element is arranged adjacent to a hardening source for an adhesive and hardening the adhesive on the fastening element by activating the hardening source.

4. BRIEF DESCRIPTION OF THE ACCOMPANYING DRAWINGS

Figure 2:
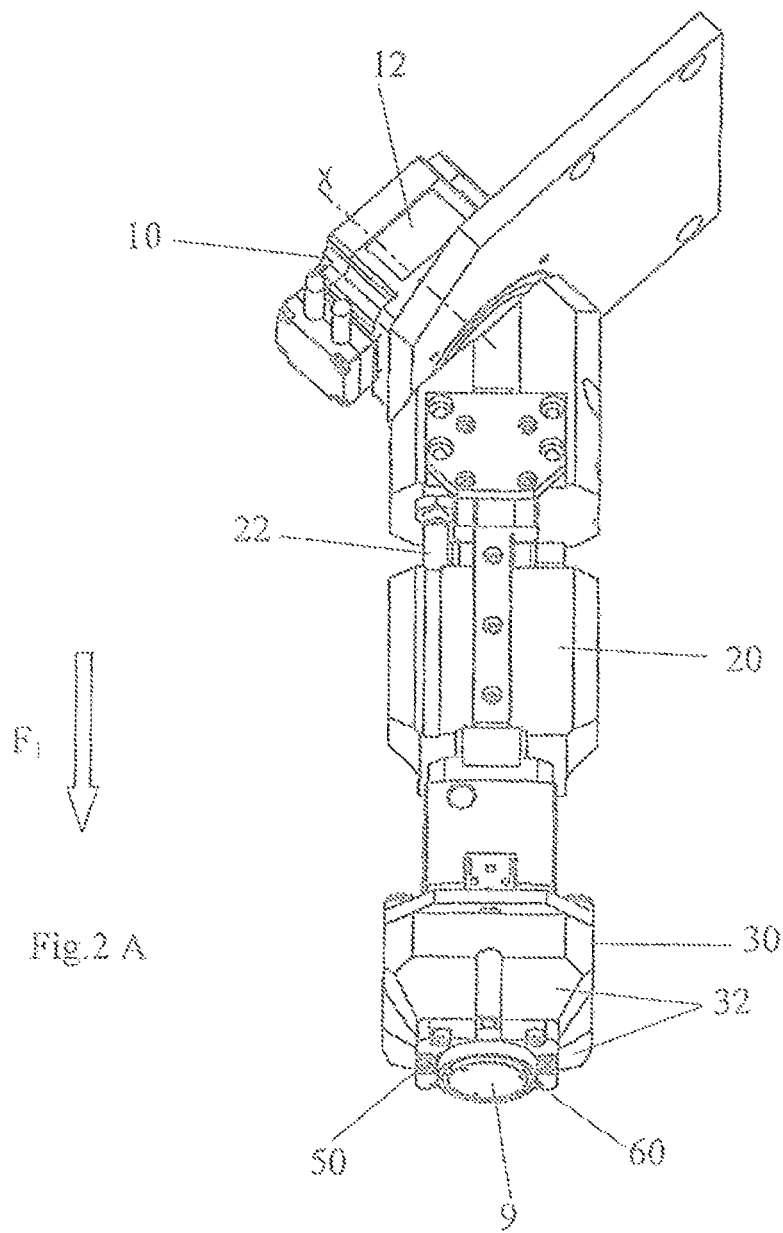
Figure 2:
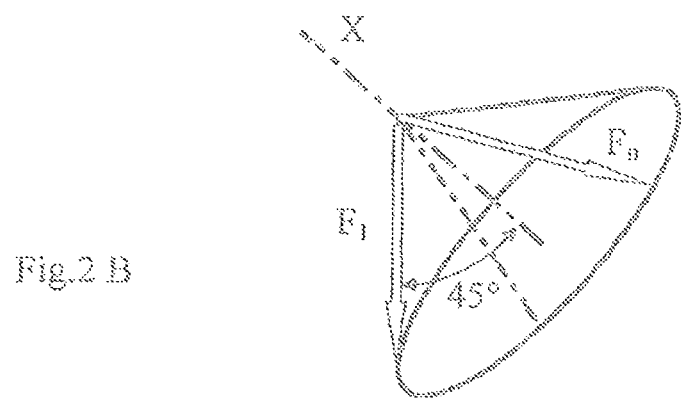
Figure 3:
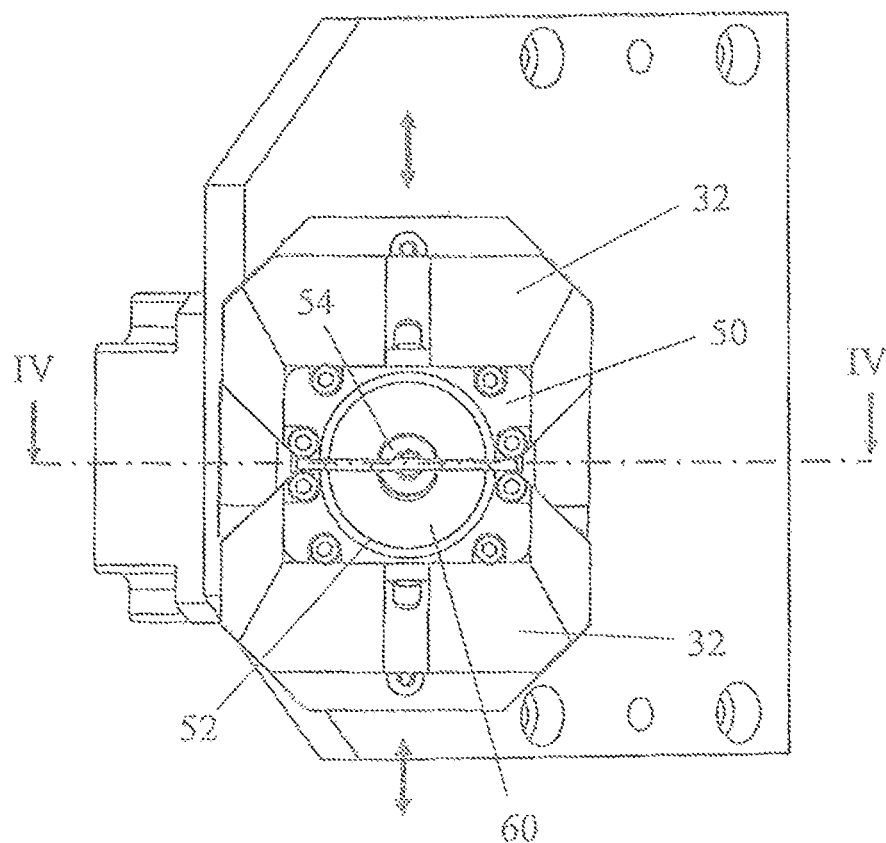
Figure 4:
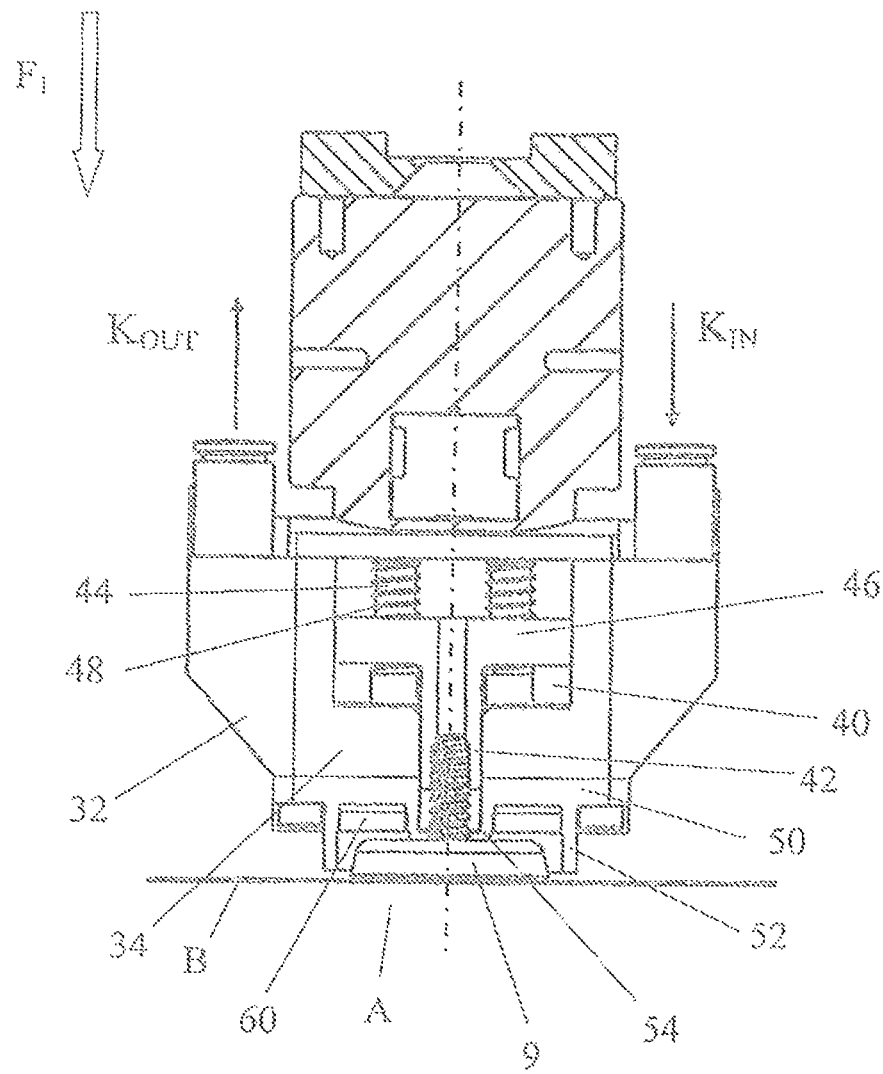
Figure 5:
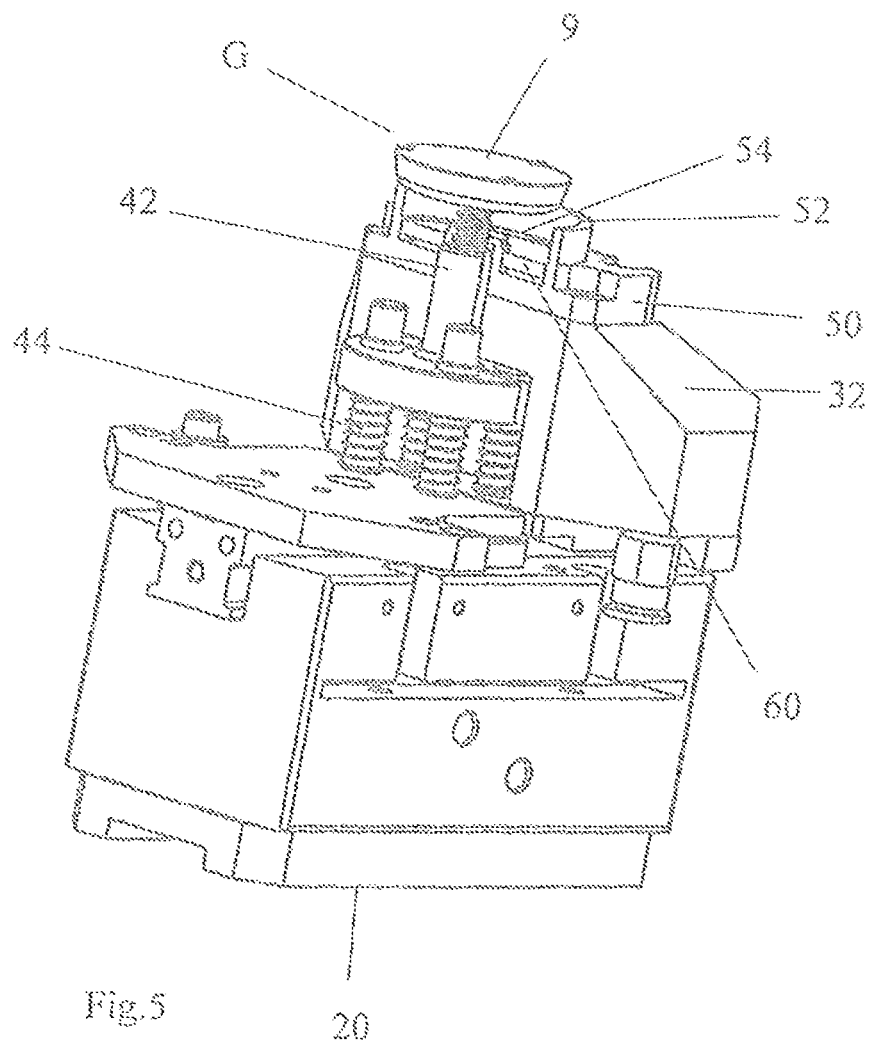
Figure 11:
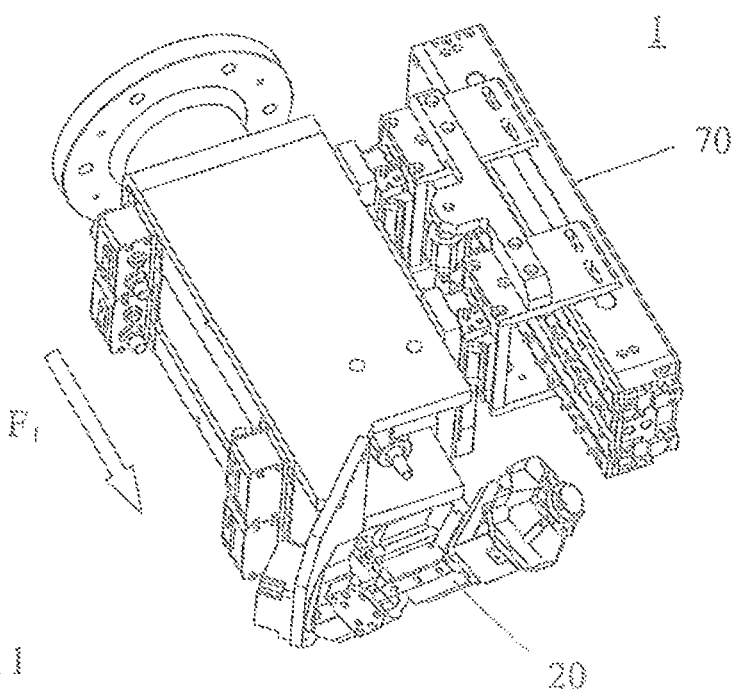
Figure 12:
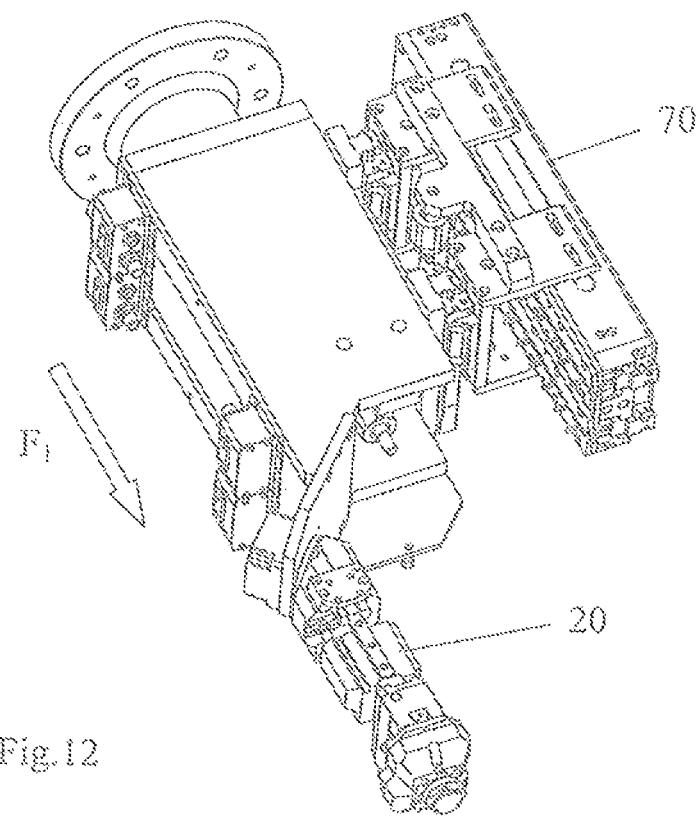
Figure 13:
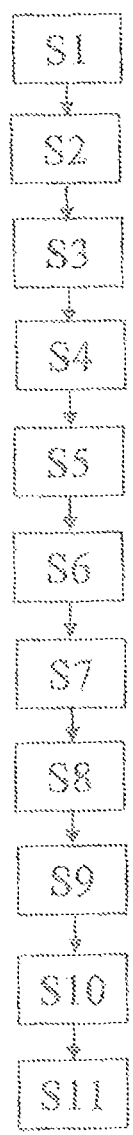

The preferred embodiments of the present invention are explained in greater detail with reference to the accompanying drawing. In the figures:

FIG. 1 shows a preferred embodiment of the jointing head with a cartridge according to the invention, FIG. 2A shows a perspective view of the jointing head from FIG. 1 without a cartridge, FIG. 2B is a schematic representation of the first jointing direction and additional jointing direction relative to the rotary axis of the jointing head from FIG. 2A, FIG. 3 shows a plan view of the gripper of the jointing head from FIG. 1 opposite the jointing direction, FIG. 4 shows a sectional view along line IV-IV from FIG. 3, FIG. 5 shows a perspective view of a preferred embodiment of the gripper with a compensation mechanism, FIG. 6-12 show various sequences of the fastening method of the preferred jointing head from FIG. 1 and FIG. 13 shows a flow chart of a preferred embodiment of the fastening method of the present invention.

5. DETAILED DESCRIPTION OF THE PREFERRED EMBODIMENTS

A preferred embodiment of the jointing head 1 according to the invention is shown in FIG. 1. The jointing head 1 comprises an attachment or fastening plate 2 for connecting the jointing head 1 to a robot or an automated jointing machine (not shown). The jointing head 1 is preferably used in combination with a 6-axis robot. It is also conceivable to use a robot with 2 to 5 axes in combination with the jointing head 1.

A support or intermediate piece 4 abuts the fastening plate 2. A cartridge 70 as well as a gripper arm 20 with a gripper 30 is fastened to this intermediate piece 4. The gripper 30 and gripper arm 20 can be swung by a swinging or pivoting mechanism to the cartridge 70. The gripper arm 20 with the gripper 30 assumes a jointing position (see FIG. 1) parallel to a first jointing direction $F_1$, or a swung position (see FIG. 10) perpendicular to the first jointing direction $F_1$ for removing a fastening element 9 from the cartridge 70. Based on the pivoting movement of the gripper arm 20 with the gripper 30, one of the fastening elements 9 stored in the cartridge 70 is removed and aligned in the jointing direction F. This state is shown in FIG. 1.

The fastening element 9 is held in the gripper 30. The fastening element 9 is T-shaped, and its plate-like fastening surface, also termed plate, is oriented perpendicular to the jointing direction $F_{1,n}$. If the jointing head 1 in this arrangement is moved by means of a robot (not shown) in the jointing direction $F_{1,n}$, the jointing head 1 places the fastening element 9 on a component surface B. After the fastening element 9 is placed on the component surface B, a hardening source 60 (see below) is activated to harden adhesive on the fastening surface of the plate of the fastening element 9 facing the component surface B.

A plurality of fastening elements 9 can be accommodated in the cartridge 70 in at least one storage rail 76. Two storage rails 76 are preferably provided. For handing over the fastening element 9 to the gripper 30, the cartridge 70 comprises a first linear adjustment 72 by means of which the cartridge 70 can be moved parallel to the first jointing direction $F_1$ or to the longitudinal axis of the intermediate piece 4. To enable fastening elements 9 to be removed from at least two storage rails 76, a second linear adjustment 74 is optionally provided. The second linear adjustment 74 moves the cartridge 70 perpendicular to the first jointing direction $F_1$ or perpendicular to the direction of movement of the first linear adjustment 72 and perpendicular to the gripper arm 20 in its swung position (see FIG. 10). It is also preferable to provide a third linear adjustment (not shown) by means of which the cartridge 70 can be moved parallel to the gripper arm 20 in its swung position. The third linear adjustment supports a removal of fastening elements 9 from the cartridge 70 with a short cycle time.

The fastening elements 9 can be moved within the storage rail 76, for example by spring bias or another suitable transport mechanism. In this manner, despite the fastening element 9 being removed from a removal position E, a new fastening element 9 stored in the storage rail 76 is transported to the removal position E (see FIG. 6) where it can be removed by the gripper 30. Ten fastening elements 9 are preferably accommodated per storage rail 76. Depending on the number of fastening elements 9 to be mounted, and depending on the number of fastening points achievable by the robot and jointing head 1, the number of storage rails 76 can be adapted along with the number of fastening elements 9 stored in the storage rail 76.

FIG. 2A shows a section of the jointing head 1 from FIG. 1. In greater detail, it can be seen that the gripper arm 20 is swung by the pivoting mechanism 10. The pivoting mechanism 10 comprises an electric motor 12 or another suitable drive for the rotary movement. The electric motor 12 rotates about rotary axis X (see FIG. 2B) which is arranged at an angle of 45° relative to the first jointing direction $F_1$. Since the electric motor 12 is connected to the gripper arm 20, the gripper arm 20 is pivoted about rotary axis X when the electric motor 12 rotates. A simplified schematic representation of the jointing head 1 in FIG. 2B shows that, due to this pivoting mechanism, the first jointing direction $F_1$ is arranged parallel to a surface line on a lateral surface of a cone. The rotary axis X of the pivoting mechanism is arranged parallel to the contour line of the cone, whereas the surface line and rotary axis X enclose an angle of 45°. A taper angle of 90° results that is enclosed by two opposing surface lines. In this context, it is also preferable to use a taper angle ranging from 60° to 120° in order to reach a wide range of assembling positions on component surfaces B positioned anywhere in space.

With reference to FIG. 2B, it can also be seen that the first jointing direction $F_1$ is aligned parallel to the surface line in a parallel alignment to the longitudinal axis of the intermediate piece 4. If the electric motor 12 rotates the jointing head 1 about the rotary axis X at any rotary angle ranging from 0° to 360°, other jointing directions $F_n$ can be adjusted to be parallel to any possible surface line on the lateral surface of the cone. Since the jointing head 1 joints along the adjustable jointing directions $F_{1,n}$, the jointing head 1 reaches fastening positions at any alignment within space. It is also preferable to adapt the taper angle and hence the settable jointing directions $F_{1,n}$ to the fastening positions to be assumed so that these fastening positions are reached as quickly as possible, that is, by the shortest path of travel. Furthermore, the pivoting mechanism ensures that the gripper 30 can remove single fastening elements 9 from the cartridge 70 at the removal position E. When the taper angle deviates from 90°, the swung position of the gripper 30 is not arranged at right angle but rather corresponding to the taper angle relative to the first jointing direction $F_1$.

This pivoting mechanism 10 ensures that mounting force is transmitted by the robot (not shown) to the fastening element 9 with little wear to the robot, jointing head 1 and rotary axis in comparison with known arrangements. This makes it possible to provide the jointing head 1 without a feed unit in the jointing direction $F_{1,n}$ since the feed and mounting movement is executed solely by the robot (not shown).

In order to dampen mechanical overloads on the jointing head 1 from the feed and mounting movement of the robot (not shown), a damping mechanism 22 is preferably provided on the gripper arm 20. The gripper arm 20 is interrupted at the location of the damping mechanism 22, and the two neighboring parts of the gripper arm 20 are connected to each other by the damping mechanism 22. The damping mechanism 22 comprises a linear guide parallel to the longitudinal axis of the gripping arm 20. The linear guide is coupled to a damper in order to dampers mechanical loads in the longitudinal direction of the gripping arm 20 between the two parts of the gripping arm 20. The damper preferably consists of a spring, a pneumatic cylinder or a hydraulic cylinder. According to a preferred embodiment, the damper is realized as a passive element. That is, when mechanical loads are above a threshold load, the length of the damper decreases in a damping manner and thereby absorbs mechanical energy. At the same time, the length of the gripping arm 20 is also reduced. Once the mechanical load falls below the threshold load, the damper and hence the gripping arm 20 as well return to their initial length. According to another preferred embodiment, the pneumatic or hydraulic cylinder of the damper is designed as an active element. The gripping arm 20 can thereby be shortened or lengthened by specifically controlling the damper in order, for example, to support the removal of the fastening elements 9 from the cartridge 70, or a mounting of the fastening element 9 on the component surface B.

The fastening elements 9 are removed by the gripper 30 from the cartridge 70 and affixed to the component surface B. The gripper 30 comprises at least two gripper jaws 32 that execute an opening and closing movement in the direction of the arrow in FIG. 3 to grip the fastening element 9. For this purpose, the fastening element 9 preferably consists of the above-described T-shaped structure with a bolt and a plate-like end.

The bolt of the fastening element 9 is held in a central opening of the gripper 30 as illustrated in FIGS. 3 and 4. A collar piece 50 is attached to the gripper jaws 32. The collar piece 50 comprises a radially peripheral outer collar 52 that protects in the jointing direction F. Inside the middle of the collar 52, a central stop 54 projects which surrounds the central opening of the gripper 30 for accommodating the bolt of the fastening element 9 (see FIG. 4).

A hardening source 60 is arranged within the collar 52. According to a preferred embodiment of the present invention, this hardening source 60 is a light source, especially an annular LED. The annular LED emits light of a specific wavelength to activate and/or harden the adhesive on the fastening element 9. It is also preferable for the annular LED to be composed of individual LEDs so that at least one LED is arranged on each gripper jaw 32. When the gripper 30 grips the fastening element 9, the gripper jaws 32 move towards each other, and the individual LEDs thereby form the annular hardening source. According to another embodiment of the present invention, the light source 60 is combined with a lens to bundle the light in the direction of the fastening element 9. The lens (not shown) is arranged in front of the light source 60 in the jointing direction $F_{1,n}$.

The hardening source 60 which, in addition to a light source, can also be a heat source, radiates hardening radiation, that is, light or heat, in the jointing direction $F_{1,n}$. Light or heat radiated radially outward is reflected by the radial inside of the collar 52 and thereby reflected back to the fastening element 9. In this manner, the hardening radiation emitted by the hardening source 60 is concentrated or bundled on the fastening element 9. For additional support, it is therefore preferable to polish or mirror coat the radial inside of the collar 52 and/or provide it with a contoured surface. These design details prevent the loss of hardening radiation and supply the maximum amount of hardening radiation to the fastening element 9, in particular to the plate of the fastening element 9. In addition, the peripheral collar 52 is preferably dimensioned seen that the perimeter of the plate of the fastening element 9 is almost completely enclosed by the peripheral collar 52 when in a mounted state on the component surface B. Light/heat reflected by the collar 52 is thereby supplied to the plate of the fastening element 9, and this shortens the cycle time for hardening the adhesive. At the same time, the plate extends far enough beyond the collar 52 in the jointing direction $F_{1,n}$ so that the collar 52 does not collide with the component surface B when the fastening element 9 is mounted thereupon.

While operating, the hardening source 60 develops heat that must be released. When a light source is the hardening source 60, excessive heat, for example, causes the wavelength of the emitted light to shift unfavorably and disadvantageously reduces the intensity of the light. To support the removal of heat and cooling of the hardening source 60, the collar piece 50 and gripper jaws 32 consist of thermally conductive material such as metal. In addition, the gripper jaws 32 are preferably designed as heat sinks. Alternatively, the heat sink is preferably realized as a gripper jaw 32 with a large surface or larger in comparison to the prior art. According to another preferred embodiment, the gripper jaws 32 are connected to a cooling circuit (not shown), and cooling liquid flows through them. A liquid cooling system as shown in FIG. 4 that is integrated in at least one or each gripper jaw 32 guarantees this flow of cooling liquid. The gripper jaw 32 comprises a feed $K_{IN}$ and discharge $K_{OUT}$ for cooling liquid. The operating temperature of the hardening source 60 is maintained within a desired temperature range to guarantee the required emission of hardening radiation by the circulation of the cooling liquid through the gripper jaw and a cooler (not shown) for cooling the cooling liquid.

In addition, the jointing head 1 preferably comprises the compensation mechanism 40 as can be seen in FIGS. 4 and 5 according to a preferred embodiment. The compensation mechanism 40 ensures that the fastening element 9 is optimally positioned adjacent to the hardening source 60 in a hardening position when the fastening element 9 is mounted and affixed to the component surface B. In order to remove a fastening element 9 from the cartridge 70, the gripper jaws 32 extend, i.e., radially outward according to the arrows in FIG. 3. This movement is also executed by the gripper shells 42 that are arranged radially inward relative to the gripper jaws 32. In addition, the gripper shells 42 are spring-biased and movably arranged in the jointing direction $F_{1,n}$ by means of at least one linear guide 44. It is also preferable to use pneumatic springs instead of the spring-biased linear grades 44.

According to the preferred embodiments of the present invention displayed in FIGS. 4 and 5, the gripper shells 42 are connected by a plate 46 to the linear guide 44 and are spring-biased by springs 48 in the jointing direction F. It is also preferable to realize the pretension of the gripper shells 42 by means of pneumatic cylinders or hydraulic cylinders.

When the gripper jaws 32 are open, the compensation mechanism 40 is in a relaxed state in which the plate 46 and gripper jaw 42 are maximally shifted in the jointing direction $F_{1,n}$ (see FIG. 5). In this case, the gripper shells 42 contact the stop 54 of the collar piece 50 radially to the inside.

When the gripper 30 removes a fastening element 9 from the cartridge 70, the bolt of the fastening element 9 is gripped at different axial positions. This is due to control tolerances between the cartridge 70 and gripper 50 of the jointing head 1. After gripping, the fastening element 9 is in the gripper position G. In the gripper position G, the plate-like end of the fastening element 9 is therefore not reproducibly arranged and is always at a different distance from the hardening source 60 as can be seen in FIG. 5.

For reliable hardening, the fastening element 9 must be positioned adjacent to the hardening source 60 in the hardening position A. To ensure this, the mechanical pretension of the gripper shells 42 is adjusted in the jointing direction $F_{1,n}$ so that, when the fastening element 9 is mounted on the component surface B, the gripper shells 42 enter the gripper 30 or are shifted opposite the mechanical pretension and opposite the jointing direction F when the fastening elements 9 is mounted on the component surface B. The fastening element 9 and gripper shells 42 enter the gripper 30 until the plate-like end of the fastening element 9 lies against the central stop 54 (see FIG. 4). In this hardening position A, the fastening element 9 is optimally arranged relative to the hardening source 60 and collar 52. By means of the light radiated front the hardening or light source 60, the adhesive on the fastening element 9 is activated and/or hardened. Then the gripper jaws 32 and gripper shells 42 extend and release the fastening element 9, and the compensation mechanism 40 returns to its related state.

FIG. 6-12 show the different sequences of a preferred method for fastening a fastening element 9 to the component surface B. In addition, FIG. 13 shows a flowchart of a preferred embodiment of the fastening method. An example of the fastening method is explained with reference to the configuration in which the rotary axis is aligned at a 45° angle relative to the jointing direction $F_{1,n}$, and the fastening element 9 is jointed in a first jointing direction $F_1$. It is likewise preferable for the rotary axis to be arranged at a different angle (see above) and to joint the fastening element 9 in any desired jointing direction $F_n$ on the lateral surface of the cone (see above).

Figure 6:
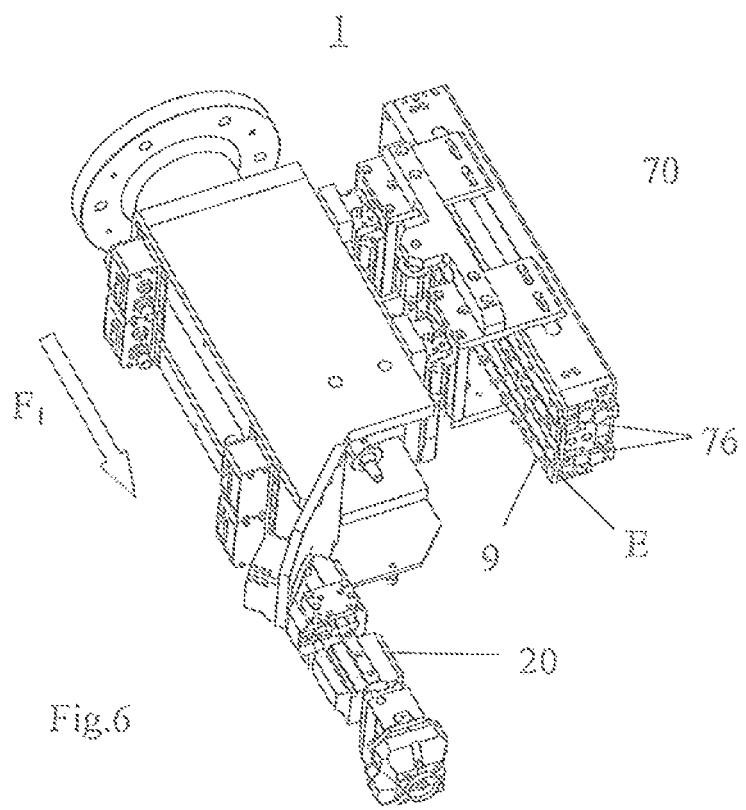

FIG. 6 shows the jointing head 1 in a home position in which the gripper arm 20 is aligned parallel to the first jointing direction $F_1$. Before the fastening element 9 can be affixed to the component surface B, adhesive is first applied to a plurality of fastening elements 9 in step S1. In the following step S2, these fastening elements 9 are loaded into at least one storage rail 76 of the cartridge 70 (not shown).

Figure 7:
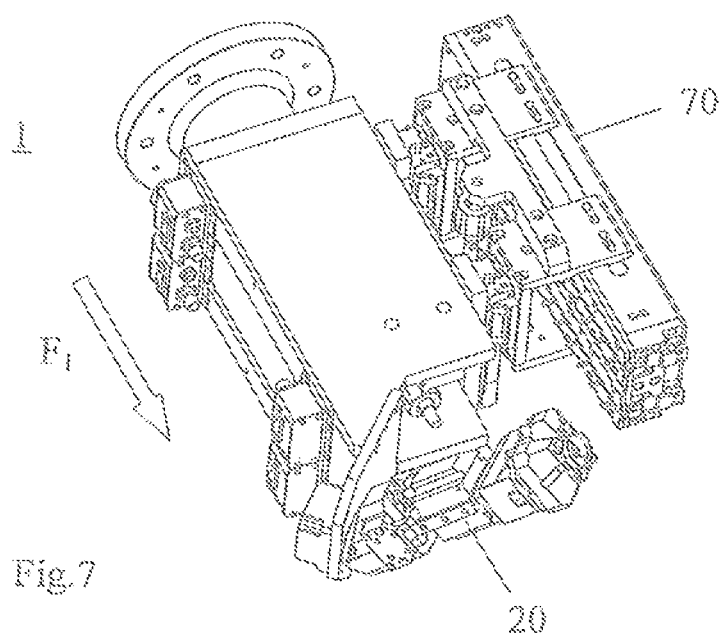
Figure 8:
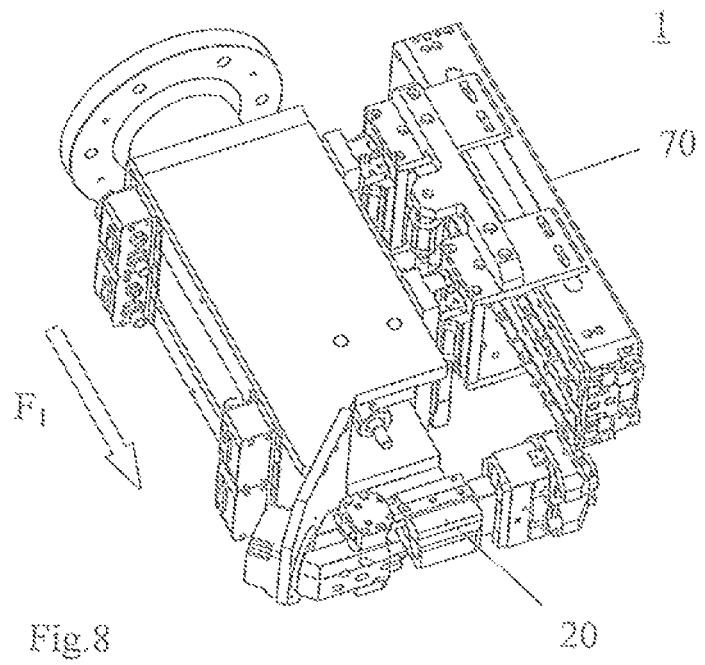
Figure 9:
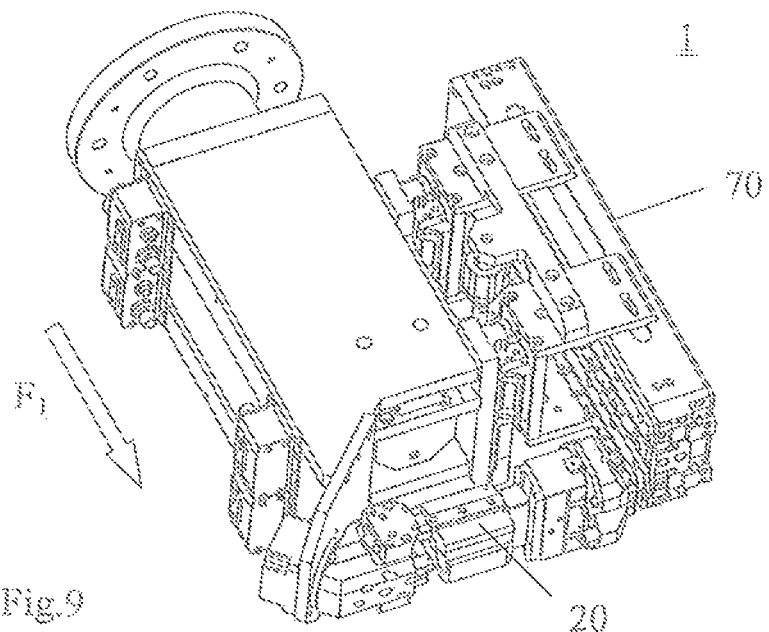
Figure 10:
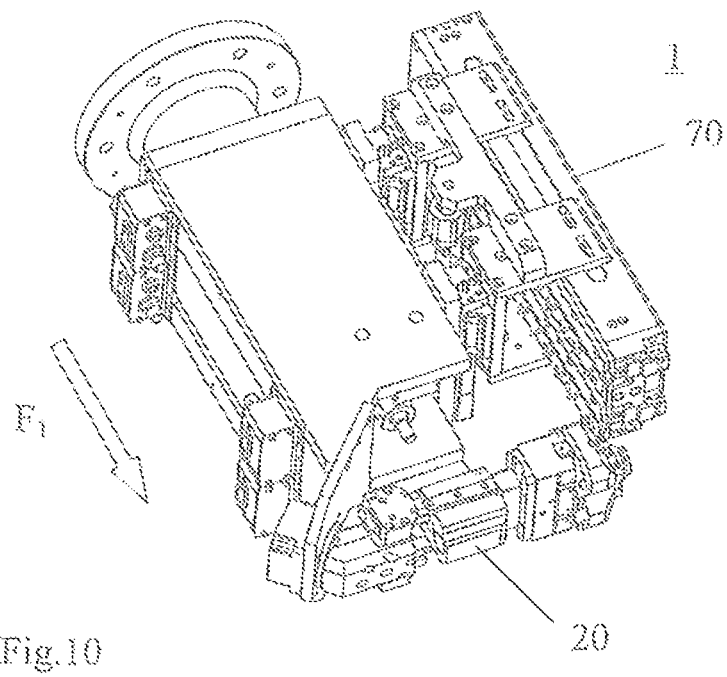

When the jointing head is in its home position according to FIG. 6 in which fastening elements 9 provided with adhesive are loaded into the storage rail 76 of the cartridge 70, the gripper 30 swings toward the cartridge 70 in step S3 (see FIG. 7). While swinging, the gripper 30 rotates about the rotary axis or pivot axis X (see above, not shown) that is preferably aligned at a 45° angle relative to the jointing direction $F_{1,n}$. The gripper arm 20 with the gripper 30 swings to the deposit position in which it is aligned perpendicular to the first jointing direction $F_1$ and preferably perpendicular to the longitudinal axis of the cartridge 70 (see FIG. 8). When the taper angle is not 90° (see above), the gripper swings by rotating about a rotary access X to the removal position E of the cartridge 70, that is, to the deposit position which is not arranged perpendicular to the jointing direction $F_{1,n}$. Then the fastening element 9 is removed from the cartridge 70 in the same manner as described below.

In the following step S4, the gripper 30 opens the gripper jaws 32 with the gripper shells 42. Then in step S5, the cartridge 70 is moved so that the fastening element 9 is arranged at the removal position E of the storage rail 76 between the open gripper jaws 32. The cartridge 70 is moved by the above-described linear adjustments 72, 74 (see FIG. 9).

In step S6, the gripper jaws 32 of the gripper 30 close and grip the fastening element 9 in the gripper position G. Then in step S7, the linear adjustments 72 and/or 74 move the cartridge 70 opposite the first jointing direction $F_1$ or opposite the longitudinal axis of the cartridge 70 or another orientation to the jointing direction $F_{1,n}$ such that the fastening element 9 is removed from the removal position E of the cartridge 70 (see FIG. 10).

In step S8, the gripper arm 20 with the gripper 30 and the fastening element 9 held therein swing back to be arranged parallel to the first jointing direction $F_1$ as shown in FIGS. 11 and 12. It is also preferable for the gripper 30 to swing in a parallel alignment with another jointing direction $F_n$ on the lateral surface of the above-described cone in order to subsequently joint the fastening element 9.

When the jointing head 1 is in the state according to FIG. 12, the robot (not shown) moves the jointing head 1 in step S9 toward the component surface B (not shown) so that the fastening element 9 is mounted on the component surface B. At the same time, the gripper shells 42 of the compensation mechanism 40 enter the gripper 30 in order to compensate for a difference between the gripper position G and hardening position A (see above). The fastening element 9 is thereby positioned adjacent to the hardening source 60 in the hardening position A. If the robot moves the jointing head 1 further in the jointing direction $F_{1,n}$ and hence toward the component surface B, a mechanical overload arises in the gripper arm 20. In this case, the damping mechanism 22 (see above) shortens the gripper arm 20 which dampens the overload. This keeps the jointing head 1 from being damaged.

In step S10, the hardening source 60, preferably a light source, is activated so that light of a specific wavelength activates and/or hardens the adhesive on the fastening element 9. During hardening, the hardening source 60 is cooled by means of the design of the gripper jaws 32. To this end, the gripper jaws 32 have a sufficiently large surface so that the surrounding air, or air blown on to the gripper jaws, ensures that the hardening source 60 is sufficiently cooled. It is also preferable to conduct cooling liquid through the gripper jaws 32 in order to cool the hardening source 60.

After the glue hardens, the gripper jaws 32 are opened in step S11, and the affixed fastening element 9 is released. The robot can now assume a new position with the jointing head 1 at which a fixing 9 is to be affixed.

REFERENCE LIST

1 Jointing head
2 Fastening plate
4 Intermediate piece
9 Fastening element
10 Pivoting mechanism
12 Electric motor
26 Gripper arm
22 Damping mechanism
30 Gripper
32 Gripper jaws
34 Water cooling for the hardening source
40 Compensation mechanism
42 Gripper shells
44 Linear guide.
46 Plate
48 Spring
50 Collar piece
52 Radially peripheral collar
54 Central stop
60 Hardening source/light source
70 Cartridge
72 Linear adjustment in the jointing direction
74 Linear adjustment perpendicular to the jointing direction
76 Storage rah for fastening elements
$F_1$ First jointing direction
$F_n$ Additional jointing directions B Component surface
E Removal position
G Gripper position
A Hardening position

The invention claimed is:

1. A jointing head that is connectable to a robot or an automatic jointing machine such that a fastening element is automatically mountable in a first jointing direction on a component surface and is affixable thereto, having the following features:
   a. a gripper by means of which the fastening element can be removed from a removal position to a gripper position, preferably from a cartridge, by means of a pivoting movement and aligned in the first jointing direction,
   b. a compensation mechanism of the gripper by means of which the fastening element, when it is mounted on the component surface, can be automatically positioned by a compensation movement of the gripper in a hardening position adjacent to a hardening source for adhesive on the fastening element to ensure a specific supply of energy to the fastening element, wherein
   c. the gripper has a radially outer peripheral collar projecting in the first joining direction so that the hardening source is arranged in the radial interior of the collar so that hardening radiation of the hardening source can be bundled in the direction of the fastening element.

2. The jointing head according to claim 1 with the gripper that can be swung on a pivot axis at a 45° angle relative to the first jointing direction.

3. The jointing head according to claim 1 with the gripper having at least two movable gripper jaws that can execute an opening and closing movement to grip the fastening element and the preferably linear adjusting movement in the first jointing direction.

4. The jointing head according to claim 3, wherein each gripper jaw has a hardening source.

5. The jointing head according to claim 1 with the collar having a stop against which the fastening element can rest during the adjusting movement of the gripper so that the fastening element is arranged at a specific distance to the hardening source.

6. The jointing head according to claim 1 with the gripper that is connected to a damping unit that dampens the overloading of the jointing head arising from an incorrect feed movement of the jointing head in the jointing direction.

7. The jointing head according to claim 6 with the damping unit comprising a passive or active linear adjustment of the gripper so that the gripper can be moved passively or actively parallel to the jointing direction.

8. The jointing head according to claim 1 with the cartridge having at least one storage rail in which fastening elements can be movably accommodated.

9. The jointing head according to claim 8 with the cartridge that can be moved parallel and perpendicular to the jointing direction so that a removal position is respectively reachable for fastening elements in each storage rail with the gripper.

10. The jointing head according to claim 1 with the hardening source that can be cooled by a heat sink.

11. The jointing head according to claim 10 in which the gripper jaw forms the heat sink with a cooling surface, and/or a liquid cooling system integrated in the gripper jaw.

12. A robot connected to a jointing head according to claim 1.

13. A method for fastening a fastening element on a component surface comprising the following steps:
   a. pivoting a gripper of a jointing head into a deposit position for the fastening element adjacent to a cartridge for fastening elements,
   b. moving the cartridge parallel and/or perpendicular to its longitudinal axis, and gripping or removing the fastening element at a removal position of the cartridge by the gripper into a gripper position,
   c. pivoting the gripper so that the fastening element is aligned in the direction of the first jointing direction or another jointing direction,
   d. mounting the fastening element on the component surface, and automatically compensating a difference between the gripper position and a hardening position of the fastening element so that the fastening element is arranged adjacent to a hardening source for adhesive, and
   e. hardening an adhesive on the fastening element by activating the hardening source.

14. The fastening method according to claim 13, wherein the pivoting is executed on a pivot axis at a 45° angle to the first jointing direction.

15. The jointing head according to claim 2 with the gripper having at least two movable gripper jaws that can execute an opening and closing movement to grip the fastening element and the preferably linear adjusting movement in the first jointing direction.

16. The jointing head according to claim 15, wherein each gripper jaw has a hardening source.

17. The jointing head according to claim 2 with the cartridge having at least one storage rail in which fastening elements can be movably accommodated.

18. The jointing head according to claim 15 with the hardening source that can be cooled by a heat sink.

19. The jointing head according to claim 18 in which the gripper jaw forms the heat sink with a cooling surface, and/or a liquid cooling system integrated in the gripper jaw.

20. A robot connected to a jointing head according to claim 2.

* * * * *